US012574200B2

(12) United States Patent (10) Patent No.: US 12,574,200 B2

Werner et al. (45) Date of Patent: Mar. 10, 2026

(54) CLOCK AND MULTI-VALUED DATA SIGNALING

(71) Applicant: Rambus Inc., San Jose, CA (US)

(72) Inventors: Carl W. Werner, Los Gatos, CA (US);
Masum Hossain, Edmonton (CA);
Richelle L. Smith, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 118 days.

(21) Appl. No.: 18/516,597

(22) Filed: Nov. 21, 2023

(65) Prior Publication Data

US 2024/0178986 A1 May 30, 2024

Related U.S. Application Data

(60) Provisional application No. 63/428,293, filed on Nov. 28, 2022.

(51) Int. Cl.
*H04L 7/00* (2006.01)
*H04L 25/493* (2006.01)

(52) U.S. Cl.
CPC .......... *H04L 7/0087* (2013.01); *H04L 7/0091* (2013.01); *H04L 25/493* (2013.01)

(58) Field of Classification Search
CPC ..... H04L 25/49; H04L 25/493; H04L 7/0091; H04L 7/0079; H04L 7/0087; H04L 7/0008
See application file for complete search history.

(56) References Cited

U.S. PATENT DOCUMENTS

| | | | |
|---|---|---|---|
| 5,198,785 A | 3/1993 | Jordan | |
| 6,769,044 B2 * | 7/2004 | Matsuzaki | H04L 25/493 |
| | | | 327/263 |
| 7,233,618 B2 | 6/2007 | Korotkov | |
| 7,787,526 B2 * | 8/2010 | McGee | H04L 25/0272 |
| | | | 375/219 |
| 7,983,348 B2 | 7/2011 | Siebert | |
| 8,254,435 B2 | 8/2012 | Kojima | |
| 8,625,661 B2 | 1/2014 | Lee et al. | |

OTHER PUBLICATIONS

Chiu, Po-Wei et al., "A 32Gb/s Digital-Intensive Single-Ended PAM-4 Transceiver for High-Speed Memory Interfaces Featuring a 2-Tap Time-Based Decision Feedback Equalizer and an In-Situ Channel-Loss Monitor", 2020 IEEE International Solid-State Circuits Conference (ISSCC 2020), Session 22, Dram & High-Speed Interfaces, 22.4, 3 pages.

(Continued)

*Primary Examiner* — Betsy Deppe

(74) *Attorney, Agent, or Firm* — The Neudeck Law Firm, LLC

(57) ABSTRACT

A communication system uses a differential edge modulation scheme having one of four or more values and a clock pulse is also encoded in each unit interval. A four-valued encoding may be as follows: prior to each unit interval, two signals are both at the same value; at the start of the unit interval, a first one of the signals is transitioned to indicate a first bit of the symbol; after a selected one of two delay periods that are less than the unit interval, the other signal is transitioned to indicate a second bit of the symbol; after this transition, both signals are again at the same value. The transitioning, at the start of the unit interval, provides an edge that may be extracted and used a timing reference.

20 Claims, 13 Drawing Sheets

TRANSMIT, VIA A FIRST OUTPUT, SIGNALS TO INDICATE A FIRST TIME SEQUENCE OF BINARY VALUED BITS COMPRISING A FIRST BINARY VALUE AND A SECOND BINARY VALUE
1002

TRANSMIT, VIA A SECOND OUTPUT, SIGNALS TO INDICATE A SECOND TIME SEQUENCE OF BINARY VALUED BITS COMPRISING THE FIRST BINARY VALUE AND THE SECOND BINARY VALUE
1004

CONTROL THE FIRST OUTPUT AND THE SECOND OUTPUT TO COLLECTIVELY TRANSMIT A PLURALITY OF BITS PER UNIT INTERVAL ENCODED AS RELATIONSHIPS BETWEEN TRANSITION TIMINGS OF THE FIRST OUTPUT AND THE SECOND OUTPUT AND TO COLLECTIVELY TRANSMIT A CLOCK SIGNAL.
1006

(56) References Cited

OTHER PUBLICATIONS

Chiu, Po-Wei et al., "A 65-nm 10-GB/s 10-mm On-Chip Serial Link Featuring a Digital-Intensive Time-Based Decision Feedback Equalizer", IEEE Journal of Solid-State Circuits, vol. 53, No. 4, Apr. 2018. 11 pages.

Lee, Sooeun et al., "A 7.8 Gb/s/pin, 1.96 pJ/b Transceiver With Phase-Difference-Modulation Signaling for Highly Reflective Interconnects", IEEE Transactions on Circuits and Systems—I: Regular Papers, vol. 67, No. 6, Jun. 2020. 14 pages.

Lee, Sooeun et al., "A DFE-Enhanced Phase-Difference Modulation Signaling for Multi-Drop Memory Interfaces", IEEE Transactions on Circuits and Systems—II: Express Briefs, vol. 68, No. 6, Jun. 2021. 5 pages.

Mehrabi, Taha et al., "Design of a Time Mode SerDes Using Differential Pulse Position Modulation (DPPM)", 2017 IEEE 30th Canadian Conference on Electrical and Computer Engineering (CCECE), 2017, 4 pages.

* cited by examiner

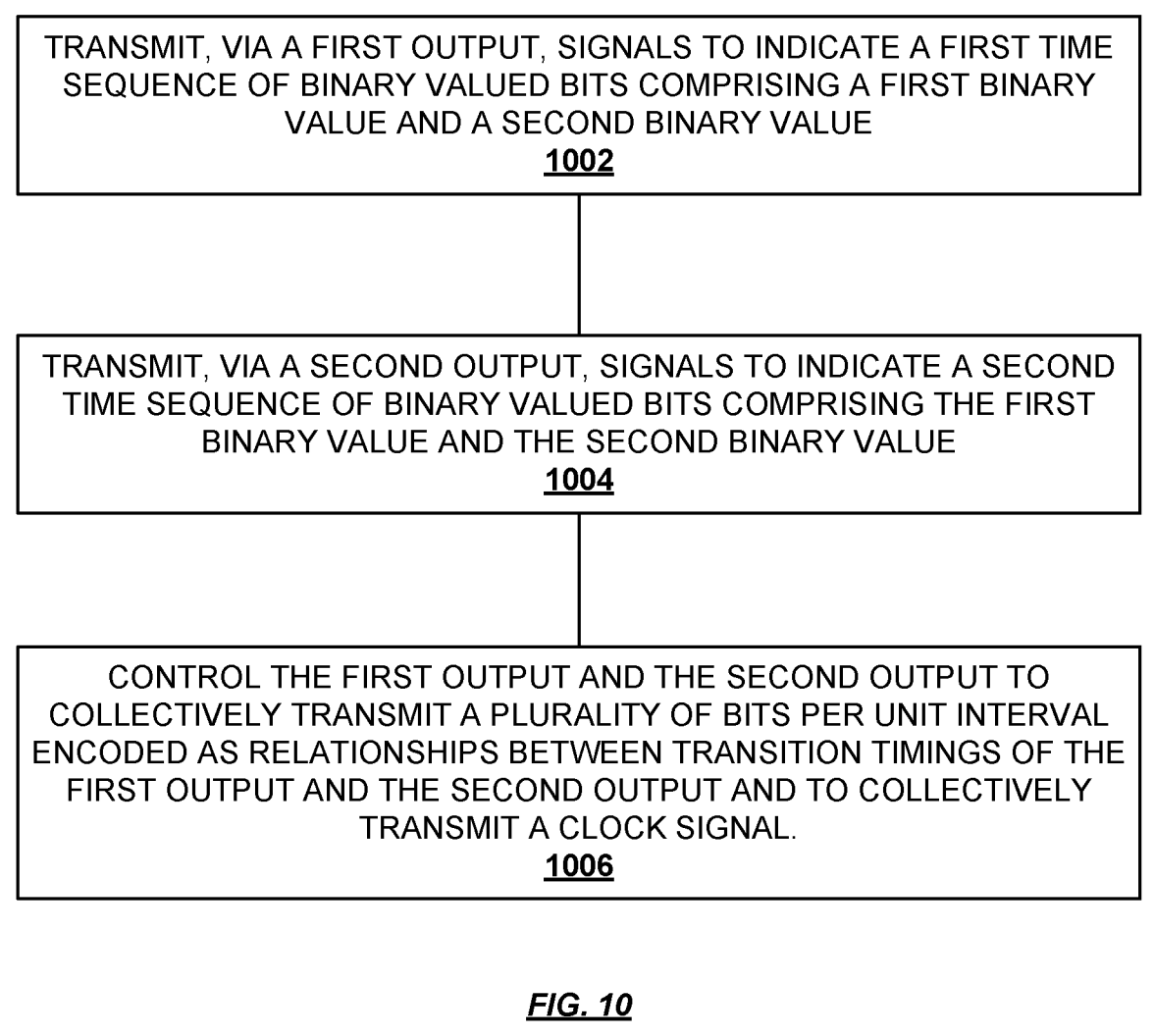

TRANSMIT, VIA A FIRST OUTPUT, SIGNALS TO INDICATE A FIRST TIME SEQUENCE OF BINARY VALUED BITS COMPRISING A FIRST BINARY VALUE AND A SECOND BINARY VALUE
1002

TRANSMIT, VIA A SECOND OUTPUT, SIGNALS TO INDICATE A SECOND TIME SEQUENCE OF BINARY VALUED BITS COMPRISING THE FIRST BINARY VALUE AND THE SECOND BINARY VALUE
1004

CONTROL THE FIRST OUTPUT AND THE SECOND OUTPUT TO COLLECTIVELY TRANSMIT A PLURALITY OF BITS PER UNIT INTERVAL ENCODED AS RELATIONSHIPS BETWEEN TRANSITION TIMINGS OF THE FIRST OUTPUT AND THE SECOND OUTPUT AND TO COLLECTIVELY TRANSMIT A CLOCK SIGNAL.
1006

*FIG. 10*

CLOCK AND MULTI-VALUED DATA SIGNALING

BRIEF DESCRIPTION OF THE DRAWINGS

FIG. 10 is a flowchart illustrating a method of operating an integrated circuit.

DETAILED DESCRIPTION OF THE EMBODIMENTS

In an embodiment, a communication system (e.g., between two or more integrated circuits) uses a differential edge modulation scheme having one of four or more values and a clock pulse is also encoded in each unit interval (e.g., clock phase). For example, a four-valued differential edge modulated encoding may be as follows: prior to each unit interval, two signals (e.g., TxP and TxN) are initially both at the same value (e.g., both indicating a "1" or "0"); at the start of the unit interval, a first one of the signals is transitioned to indicate a first bit of the symbol (e.g., representing a sign of "+" or "−"); after a selected one of two delay periods that are less than the unit interval, the other (second) signal is transitioned to indicate a second bit of the symbol (e.g., representing a magnitude of 1 or 2); after this transition, both signals are again at the same value.

The transitioning, at the start of the unit interval, of a one of the signals from being the same as the other signal provides an edge that may be extracted (e.g., by an exclusive-OR function) and used a timing reference (e.g., clock signal). The four valued scheme may be expanded to an arbitrary number of values by using a different number (e.g., 3, 4, etc.) of possible delay periods for the transitioning of the second signal.

Figure 1A:
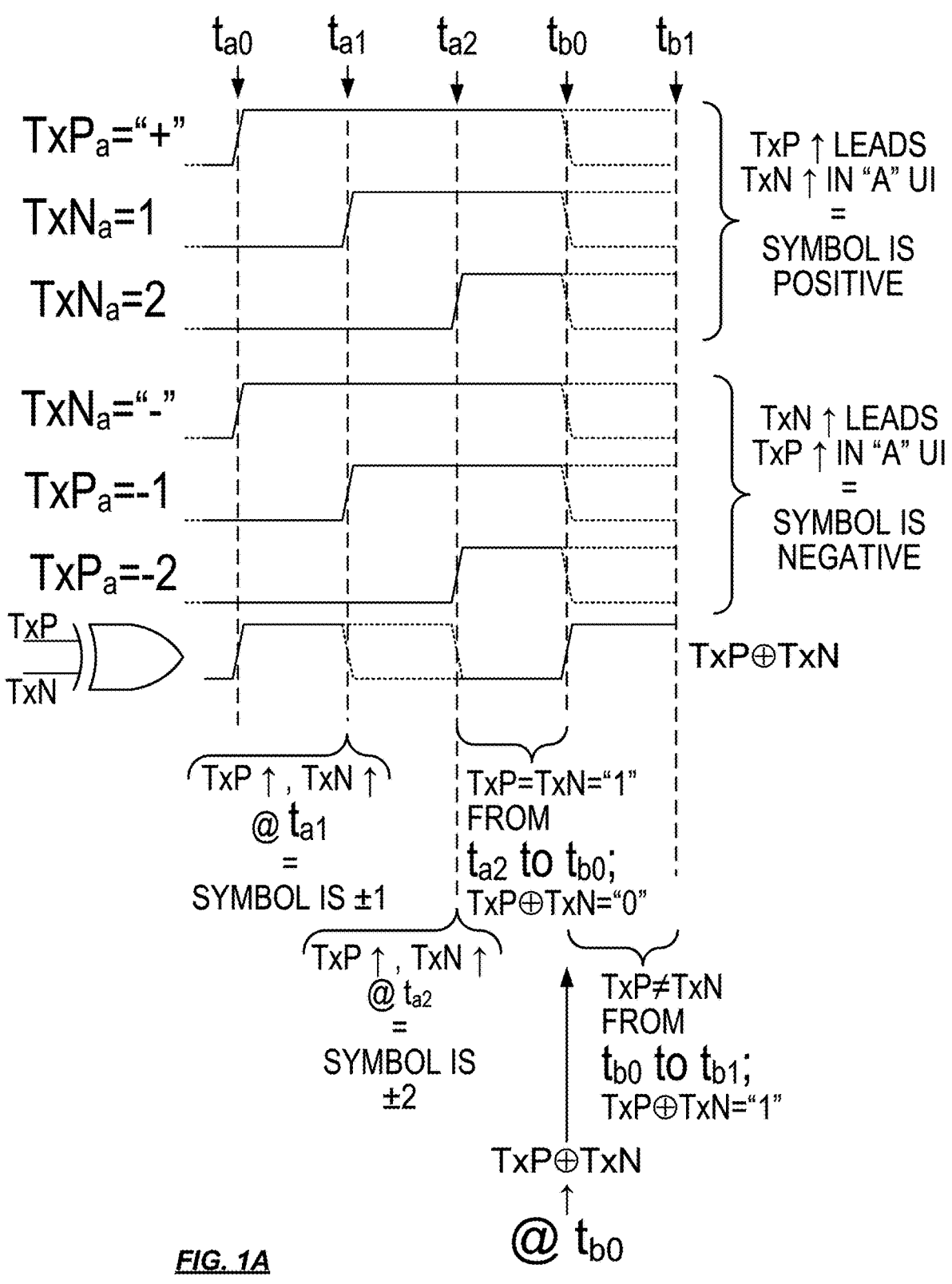
FIGS. 1A-1B are diagrams illustrating a 4-value (2-bit) signaling scheme.
Figure 1B:
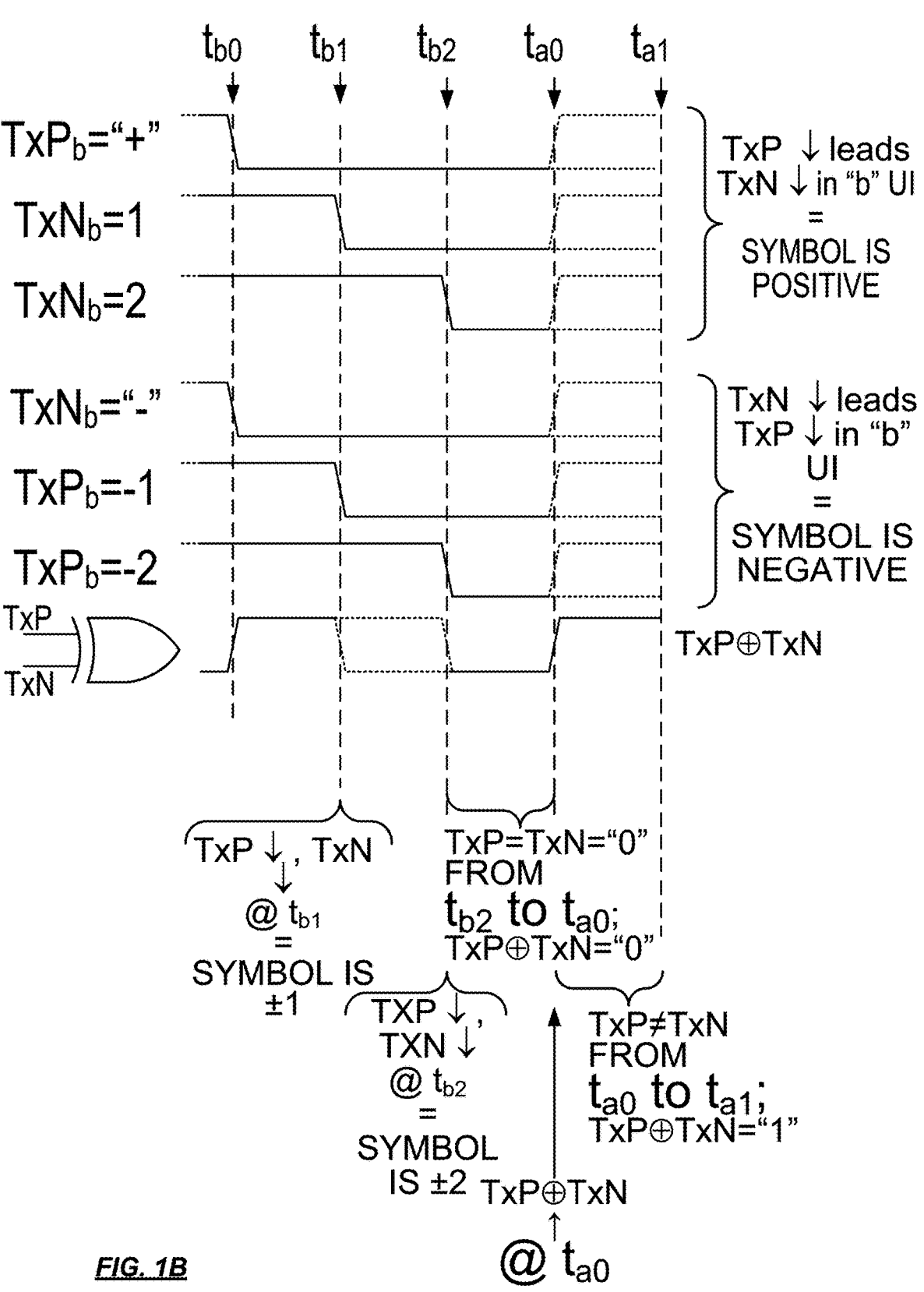

FIGS. 1A-1B are diagrams illustrating a 4-value (2-bit) signaling scheme. FIGS. 1A-1B illustrate the signaling of four values (a.k.a., symbols) which are illustrated as −2, −1, +1, and +2 (e.g., 00, 01, 10, 11 in binary). The signaling is illustrated using two signals TxP and TxN. FIG. 1A illustrates the signaling for a first unit interval (UI) "A" from the start of the "A" UI at time $t_{a0}$ to the start of the next UI (i.e., "B" UI) at time $t_{b0}$. FIG. 1B illustrates the signaling for a second unit interval "B" from the start of the "B" UI at time $t_{b0}$ to the start of the next UI (i.e., "A" UI) at time $t_{a0}$. The signaling is different for the "A" UI and the "B" UI and they alternate in time (i.e., A-B-A-B . . . ). The "A" UI is illustrated in FIG. 1A with the time divisions of $t_{a0}$ (at the start of "A"), $t_{a1}$ (approximately ⅓ through "A"), and $t_{a2}$ (approximately ⅔ through "A", and $t_{b0}$ (at the end of the "A"

UI and the start of a "B" UI). Similarly, the "B" UI is illustrated in FIG. 1B with the time divisions of $t_{b0}$ (at the start of "B"), $t_{b1}$ (approximately ⅓ through "B"), and $t_{b2}$ (approximately ⅔ through "B", and $t_{a0}$ (at the end of the "B" UI and the start of an "A" UI).

Referencing FIG. 1A, both signals end the previous UI (i.e., a "B" UI) in the low (L) state. To signal a +1 or +2 (i.e., a symbol with a positive sign) in an "A" UI, TxP transitions from the low state to a high state at $t_{a0}$ while TxN remains low. To signal a +1, TxN transitions from the low state to a high state at $t_{a1}$. To signal a +2, TxN transitions from the low state to a high state at $t_{a2}$. Thus, at the end of each "A" UI, both TxP and TxN are high.

To signal a −1 or −2 (i.e., a symbol with a negative sign) in an "A" UI, TxN transitions from the low state to a high state at $t_{a0}$ while TxP remains low. To signal a −1, TxP transitions from the low state to a high state at $t_{a1}$. To signal a −2, TxP transitions from the low state to a high state at $t_{a2}$. Thus, at the end of each "A" UI, both TxP and TxN are high regardless of which symbol was transmitted in the "A" UI—which is the initial condition for the start of an "B" UI.

Referencing FIG. 1B, both signals end the previous UI (i.e., an "A" UI) in the high (H) state. To signal a +1 or +2 (i.e., a symbol with a positive sign) in a "B" UI, TxP transitions from the high state to a low state at $t_{b0}$ while TxN remains high. To signal a +1, TxN transitions from the high state to a low state at $t_{b1}$. To signal a +2, TxN transitions from the high state to a low state at $t_{b2}$. Thus, at the end of each "B" UI, both TxP and TxN are low.

To signal a −1 or −2 (i.e., a symbol with a negative sign) in a "B" UI, TxN transitions from the high state to a low state at $t_{b0}$ while TxP remains high. To signal a −1, TxP transitions from the high state to a low state at $t_{b1}$. To signal a −2, TxP transitions from the high state to a low state at $t_{b2}$. Thus, at the end of each "B" UI, both TxP and TxN are low regardless of which symbol was transmitted in the "B" UI—which is the initial condition for the start of an "A" UI.

Note that since TxP and TxN are either both high or both low at the end of each UI, the exclusive-OR (XOR) of TxP and TxN will equal a "0" (or low) from $t_{a2}$ to $t_{b0}$ and $t_{b2}$ to $t_{a0}$. However, since one of TxP and TxN transitions at $t_{a0}$ and $t_{b0}$, the exclusive-OR of TxP and TxN will also transition at $t_{a0}$ and $t_{b0}$ from a "0" to a "1" (high). Thus, the transitions of the exclusive-OR of TxP and TxN may provide a timing reference (a.k.a., clock signal) denoting the start of each UI.

Figure 2A:
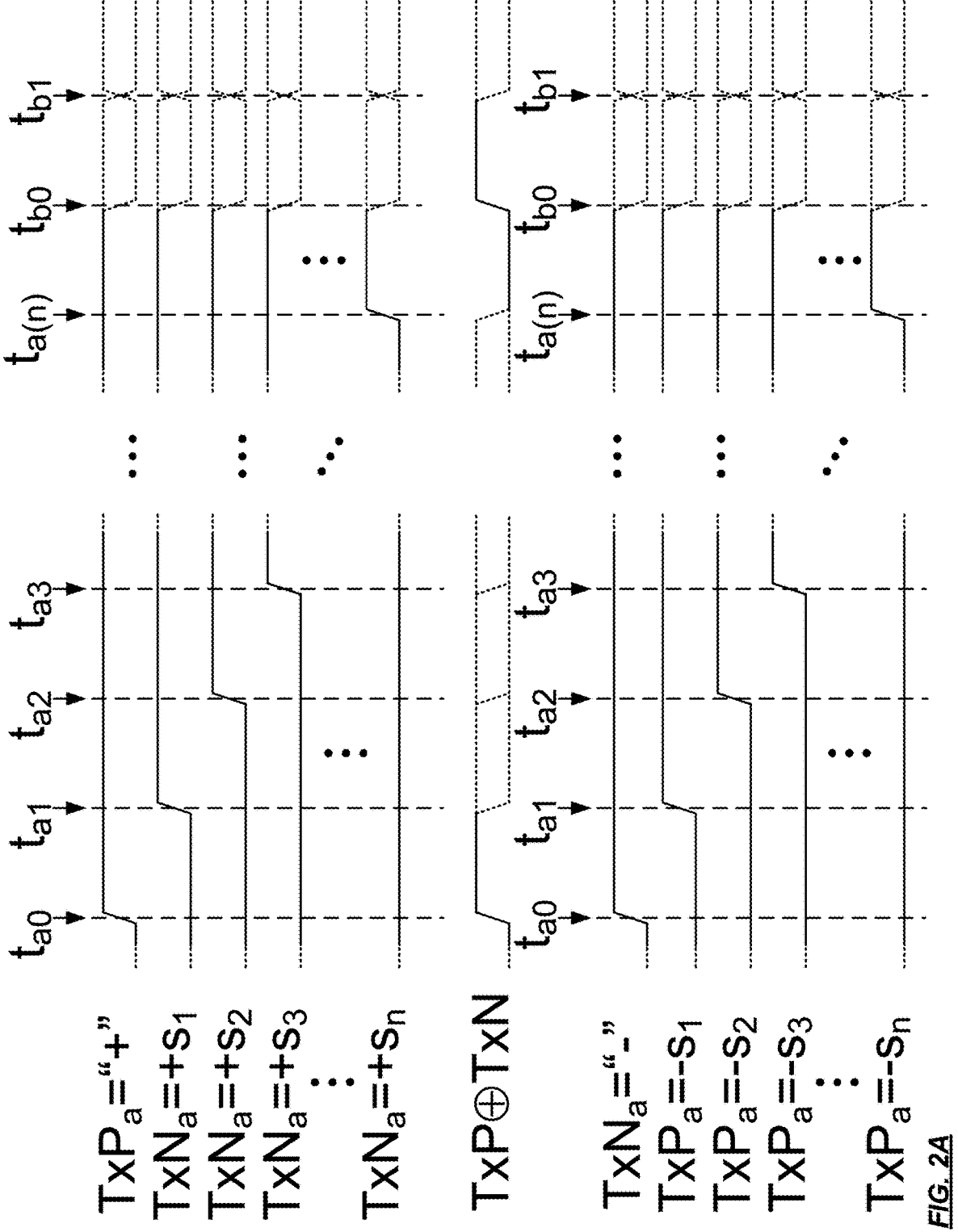
FIGS. 2A-2B are diagrams illustrating a 2N-value signaling scheme.
Figure 2B:
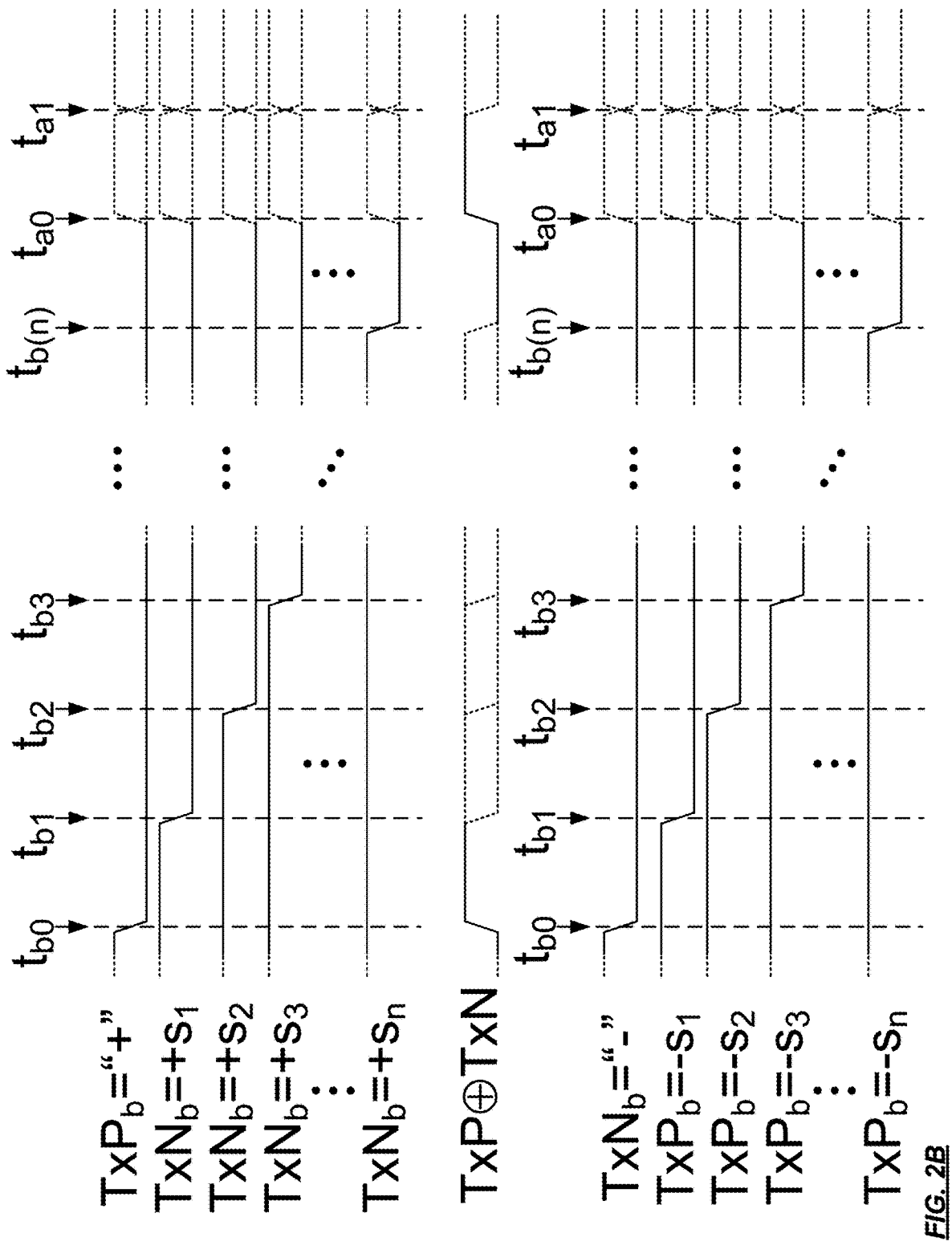

FIGS. 2A-2B are diagrams illustrating a 2N-value signaling scheme. FIGS. 2A-2B illustrate the signaling of 2×N (where N is a positive integer greater than 1) number of values (a.k.a., symbols) which are illustrated in FIGS. 2A-2B as $-s_n$, . . . $-s_2$, $-s_1$, $+s_1$, . . . . $+s_n$. It should be understand that this mapping of waveforms in FIGS. 2A-2B to symbols is arbitrary. For example, if $(t_{a1}-t_{a0})-(t_{a2}-t_{a1})= (t_{a3}-t_{a2})= . . .$ and $(t_{b1}-t_{b0})-(t_{b2}-t_{b1})-(t_{b3}-t_{b2})= . . .$, the delay signals may be considered to be delays of +1, +2, +3 . . . +N and the delay values map to data symbols s(1), s(2), s(3), . . . s(2N). Each data symbol s( ) may be assigned a decoded meaning, (e.g., 00, 11, ACK, ERR etc.) which may be data or a semaphore. In an embodiment, however, there may be different spacings between successive transition times $t_{a0}$ and $t_{a1}$, $t_{a2}$ and $t_{a3}$, etc.

The signaling in FIGS. 2A-2B is illustrated using two signals TxP and TxN. FIG. 2A illustrates the signaling for a first unit interval (UI) "A" from the start of the "A" UI at time $t_{a0}$ to the start of the next UI (i.e., "B" UI) at time $t_{b0}$. The signaling is different for the "A" UI and the "B" UI and they alternate in time (i.e., A-B-A-B . . . ). The "A" UI is illustrated in FIG. 2A with successive time divisions of $t_{a0}$ (at the start of "A"), $t_{a1}$, $t_{a2}$, $t_{a3}$, . . . $t_{a(n)}$ and $t_{b0}$ (at the end of the "A" UI and the start of a "B" UI). Similarly, the "B" UI is illustrated in FIG. 2B with successive time divisions of $t_{b0}$ (at the start of "B"), $t_{b1}$, $t_{b2}$, $t_{b3}$, . . . $t_{b(n)}$ and $t_{a0}$ (at the end of the "B" UI and the start of an "A" UI).

Referencing FIG. 2A, both signals end the previous UI (i.e., a "B" UI) in the low (L) state. To signal symbols $+s_1$, $+s_2$, . . . $+s_n$ (i.e., a symbol with a positive sign) in an "A" UI, TxP transitions from the low state to a high state at $t_{a0}$ while TxN remains low. To signal a $+s_1$, TxN transitions from the low state to a high state at $t_{a1}$. To signal a $+s_2$, TxN transitions from the low state to a high state at $t_{a2}$, and so on with $+s_n$ being signaled by a TxN transition from low to high at time $t_{a(n)}$. Thus, at the end of each "A" UI, both TxP and TxN are high.

To signal symbols $-s_1$, $-s_2$, . . . $-s_n$ (i.e., a symbol with a negative sign) in an "A" UI, TxN transitions from the low state to a high state at $t_{a0}$ while TxP remains low. To signal a $-s_1$, TxP transitions from the low state to a high state at $t_{a1}$. To signal a $s_2$, TxP transitions from the low state to a high state at $t_{a2}$ and so on with $-s_n$ being signaled by a TxP transition from low to high at time $t_{a(n)}$. Thus, at the end of each "A" UI, both TxP and TxN are high regardless of which symbol was transmitted in the "A" UI— which is the initial condition for the start of an "B" UI.

Referencing FIG. 2B, both signals end the previous UI (i.e., a "A" UI) in the high (H) state. To signal symbols $+s_1$, $+s_2$, . . . $+s_n$ (i.e., a symbol with a positive sign) in a "B" UI, TxP transitions from the high state to a low state at $t_{b0}$ while TxN remains high. To signal a $+s_1$, TxN transitions from the high state to a low state at $t_{b1}$. To signal a $+s_2$, TxN transitions from the high state to a low state at $t_{b2}$, and so on with $+s_n$ being signaled by a TxN transition from high to low at time $t_{b(n)}$. Thus, at the end of each "B" UI, both TxP and TxN are low.

To signal symbols $-s_1$, $-s_2$, . . . $-s_n$ (i.e., a symbol with a negative sign) in a "B" UI, TxN transitions from the high state to a low state at $t_{a0}$ while TxP remains high. To signal a $-s_1$, TxP transitions from the high state to a low state at $t_{a1}$. To signal a $s_2$, TxP transitions from the high state to a low state at $t_{a2}$ and so on with $-s_n$ being signaled by a TxP transition from high to low at time $t_{b(n)}$. Thus, at the end of each "B" UI, both TxP and TxN are low regardless of which symbol was transmitted in the "B" UI— which is the initial condition for the start of an "A" UI.

Note that since TxP and TxN are either both high or both low at the end of each UI, the exclusive-OR (XOR) of TxP and TxN will equal a "0" (or low) from $t_{a(n)}$ to $t_{b0}$ and $t_{b(n)}$ to $t_{a0}$. However, since one of TxP and TxN transitions at $t_{a0}$ and $t_{b0}$, the exclusive-OR of TxP and TxN will also transition at $t_{a0}$ and $t_{b0}$ from a "0" to a "1" (high). Thus, the transitions of the exclusive-OR of TxP and TxN may provide a timing reference (a.k.a., clock signal) denoting the start of each UI.

Figure 3:
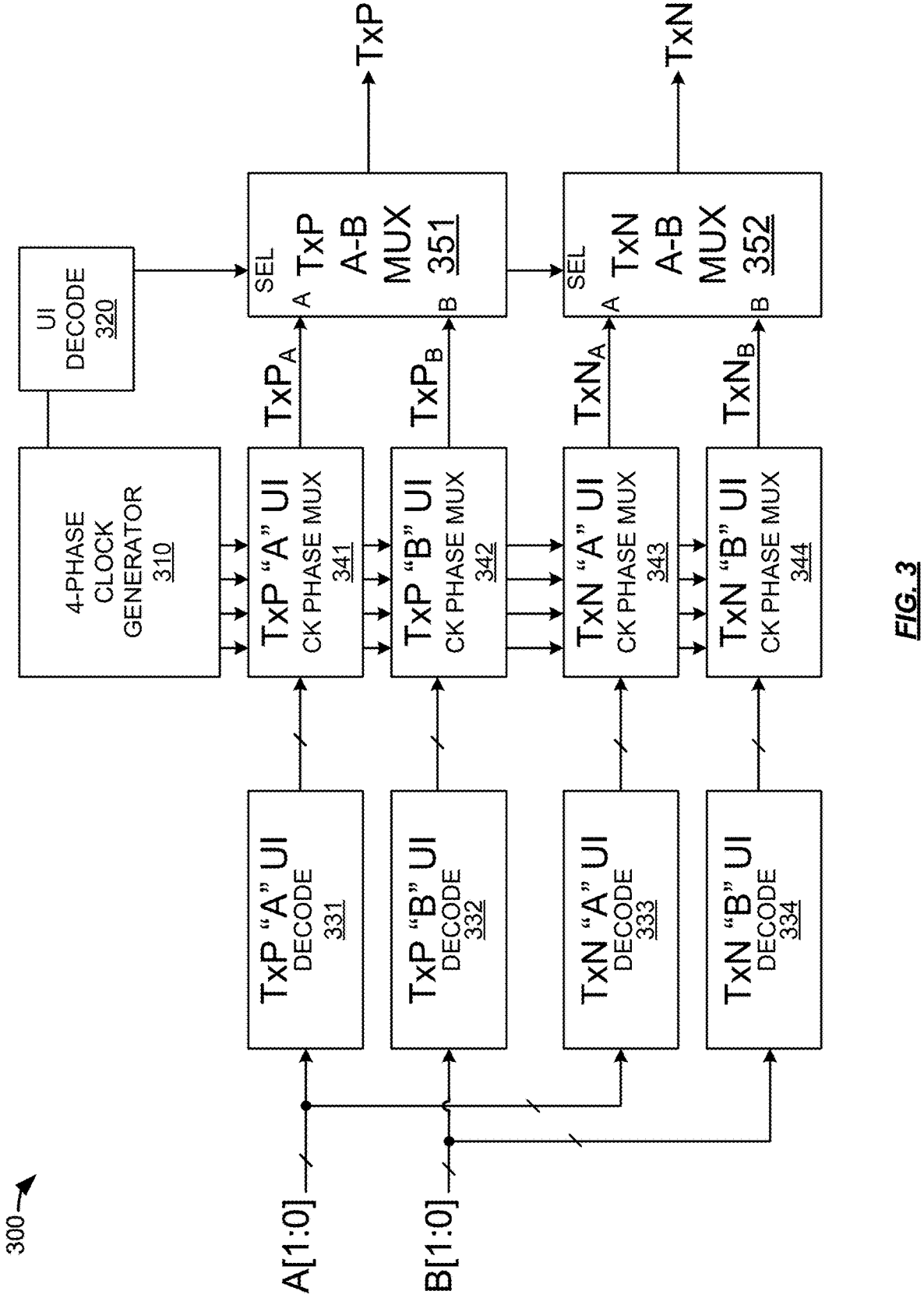
FIG. 3 is a block diagram illustrating a first example 4-value per unit interval transmitter.

FIG. 3 is a block diagram illustrating a first example 4-value per unit interval transmitter. Transmitter 300 comprises four-phase clock generator 310, unit interval decoder 320, TxP "A" UI decoder 331, TxP "B" UI decoder 332, TxN "A" UI decoder 333, TxN "B" UI decoder 334, TxP "A" UI clock phase multiplexor (MUX) 341, TxP "B" UI clock phase MUX 342, TxN "A" clock phase MUX 343, TxN "B" clock phase MUX 344, TxP A-B MUX 351, and TxN A-B MUX 352.

TxP "A" UI decoder 331 and TxN "A" UI decoder 333 receive bits A[1:0] to be transmitted during an "A" UI. TxP "A" UI decoder 331 decodes the bits A[1:0] into select signals that control TxP "A" UI clock phase MUX 341 to select the rising edge of one of three clock phases (e.g., $0°=t_{a0}$, $60°=t_{a1}$, or $120°=t_{a2}$) generated by 4-phase clock generator 310. Similarly, TxN "A" UI decoder 333 decodes the bits A[1:0] into select signals that control TxN "A" UI clock phase MUX 343 to select the rising edge of one of three clock phases (e.g., $0°=t_{a0}$, $60°=t_{a1}$, or $120°=t_{a2}$) generated by 4-phase clock generator 310. Table 1 summarizes an example decoding of bits A[1:0] to clock signal selection.

TABLE 1

| Symbol in "A" UI | TxP decoder selection | TxN decoder selection |
|---|---|---|
| A[1:0] = −2 = 00 | ↑@120° = $t_{a2}$ | ↑@0° = $t_{a0}$ |
| A[1:0] = −1 = 01 | ↑@60° = $t_{a1}$ | ↑@0° = $t_{a0}$ |
| A[1:0] = +1 = 11 | ↑@0° = $t_{a0}$ | ↑@60° = $t_{a1}$ |
| A[1:0] = +2 = 10 | ↑@0° = $t_{a0}$ | ↑@120° = $t_{a2}$ |

TxP "B" UI decoder 332 and TxN "B" UI decoder 334 receive bits B[1:0] to be transmitted during a "B" UI. TxP "B" UI decoder 332 decodes the bits B[1:0] into select signals that control TxP "B" UI clock phase MUX 342 to select the falling edge of one of three clock phases (e.g., $0°=t_{b0}$, $60°=t_{b1}$, or $120°=t_{b2}$) generated by 4-phase clock generator 310. Similarly, TxN "B" UI decoder 334 decodes the bits B[1:0] into select signals that control TxN "B" UI clock phase MUX 344 to select the falling edge of one of three clock phases (e.g., $0°=t_{b0}$, $60°=t_{b1}$, $120°=t_{b2}$) generated by 4-phase clock generator 310. Table 2 summarizes an example decoding of bits B[1:0] to clock signal selection.

TABLE 2

| Symbol in "B" UI | TxP decoder selection | TxN decoder selection |
|---|---|---|
| B[1:0] = −2 = 00 | ↓@120° = $t_{b2}$ | ↓@0° = $t_{b0}$ |
| B[1:0] = −1 = 01 | ↓@60° = $t_{b1}$ | ↓@0° = $t_{b0}$ |
| B[1:0] = +1 = 11 | ↓@0° = $t_{b0}$ | ↓@60° = $t_{b1}$ |
| B[1:0] = +2 = 10 | ↓@0° = $t_{b0}$ | ↓@120° = $t_{b2}$ |

The clock phase selected by TxP "A" UI decoder 331 is output by TxP "A" UI clock phase MUX 341 as $TxP_A$ and is provided to the "A" input of TxP A-B MUX 351. The clock phase selected by TxP "B" UI decoder 332 is output by TxP "B" UI clock phase MUX 342 as $TxP_B$ and is provided to the "B" input of TxP A-B MUX 351. TxP A-B MUX 351 is controlled by UI decoder 320 to select $TxP_A$ during "A" unit intervals and to select $TxP_B$ during "B" unit intervals. The output of TxP A-B MUX 351 is the TxP signal of the 4-value signaling pair as described herein (e.g., as shown and described with reference to FIGS. 1A-1B).

Similarly, the clock phase selected by TxN "A" UI decoder 333 is output by TxN "A" UI clock phase MUX 343 as $TxN_A$ and is provided to the "A" input of TxN A-B MUX 352. The clock phase selected by TxN "B" UI decoder 334 is output by TxN "B" UI clock phase MUX 344 as $TxN_B$ and is provided to the "B" input of TxN A-B MUX 352. TxN A-B MUX 352 is controlled by UI decoder 320 to select $TxN_A$ during "A" unit intervals and to select $TxN_B$ during "B" unit intervals. The output of TxN A-B MUX 352 is the TxN signal of the 4-value signaling pair as described herein (e.g., as shown and described with reference to FIGS. 1A-1B).

Figure 4:
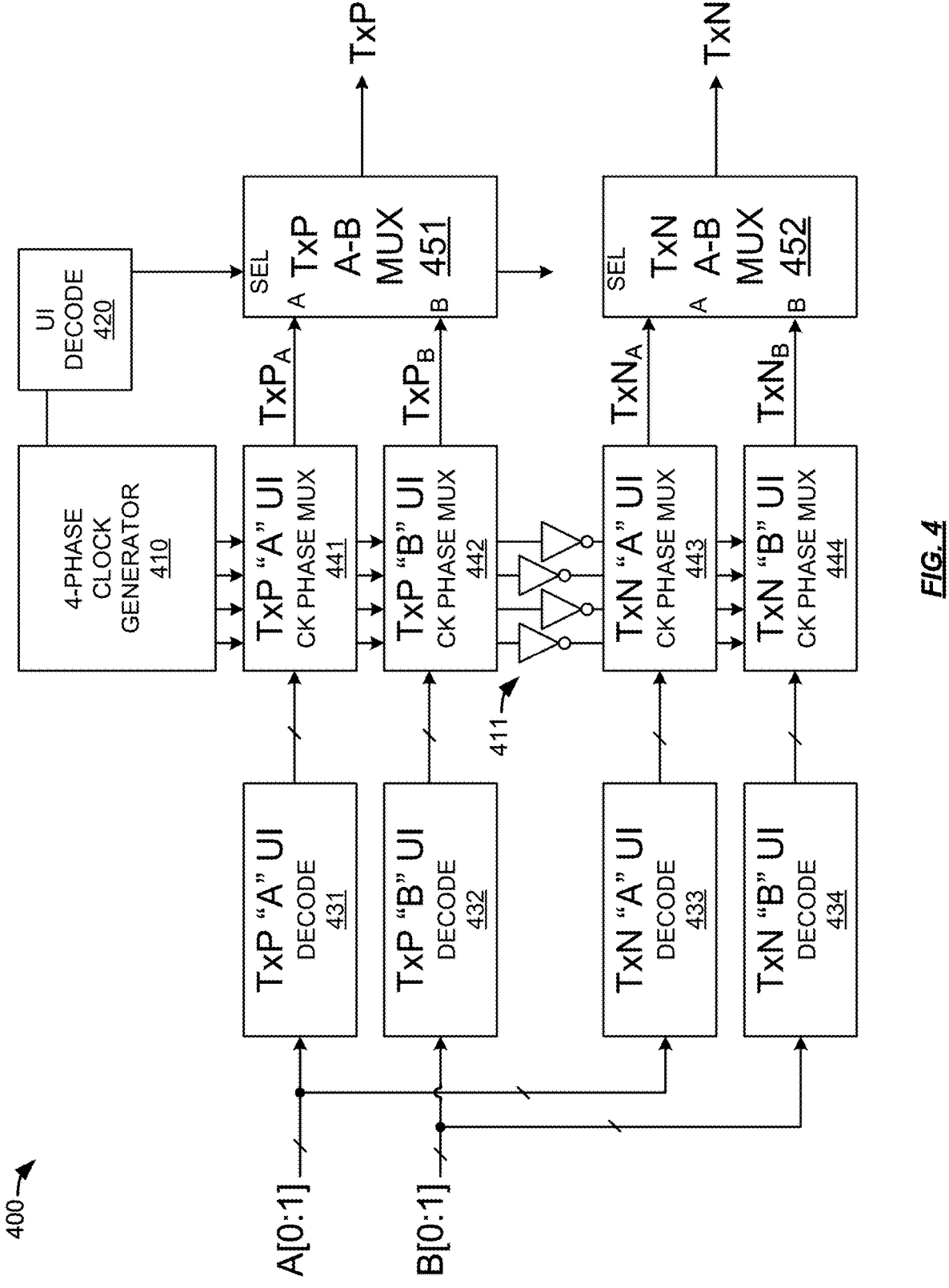
FIG. 4 is a block diagram illustrating a second example 4-value per unit interval transmitter.

FIG. 4 is a block diagram illustrating a second example 4-value per unit interval transmitter. Transmitter 400 comprises four-phase clock generator 410, clock phase inverters 411, unit interval decoder 420, TxP "A" UI decoder 431, TxP "B" UI decoder 432, TxN "A" UI decoder 433, TxN "B" UI decoder 434, TxP "A" UI clock phase multiplexor (MUX) 441, TxP "B" UI clock phase MUX 442, TxN "A" clock phase MUX 443, TxN "B" clock phase MUX 444, TxP A-B MUX 451, and TxN A-B MUX 452.

TxP "A" UI decoder 431 and TxN "A" UI decoder 433 receive bits A[1:0] to be transmitted during an "A" UI. TxP "A" UI decoder 431 decodes the bits A[1:0] into select signals that control TxP "A" UI clock phase MUX 441 to select the rising edge of one of three clock phases (e.g., $0°=t_{a0}$, $60°=t_{a1}$, or $120°=t_{a2}$) generated by 4-phase clock generator 410. Similarly, TxN "A" UI decoder 433 decodes the bits A[1:0] into select signals that control TxN "A" UI clock phase MUX 443 to select the falling edge of one of three clock phases (e.g., $0°=t_{a0}$, $60°=t_{a1}$, or $120°=t_{a2}$) generated by 4-phase clock generator 410 and then inverted by inverters 411. Table 3 summarizes an example decoding of bits A[1:0] to clock signal selection.

TABLE 3

| Symbol in "A" UI | TxP decoder selection | TxN decoder selection |
|---|---|---|
| A[1:0] = −2 = 00 | ↑@120° = $t_{a2}$ | ↓@0° = $t_{a0}$ |
| A[1:0] = −1 = 01 | ↑@60° = $t_{a1}$ | ↓@0° = $t_{a0}$ |
| A[1:0] = +1 = 10 | ↑@0° = $t_{a0}$ | ↓@60° = $t_{a1}$ |
| A[1:0] = +2 = 11 | ↑@0° = $t_{a0}$ | ↓@120° = $t_{a2}$ |

TxP "B" UI decoder 432 and TxN "B" UI decoder 434 receive bits B[1:0] to be transmitted during a "B" UI. TxP "B" UI decoder 432 decodes the bits B[1:0] into select signals that control TxP "B" UI clock phase MUX 442 to select the falling edge of one of three clock phases (e.g., $0°=t_{b0}$, $60°=t_{b1}$, or $120°=t_{b2}$) generated by 4-phase clock generator 410. Similarly, TxN "B" UI decoder 434 decodes the bits B[1:0] into select signals that control TxN "B" UI clock phase MUX 444 to select the rising edge of one of three clock phases (e.g., $0°=t_{b0}$, $60°=t_{b1}$, $120°=t_{b2}$) generated by 4-phase clock generator 410 and then inverted by inverters 411. Table 2 summarizes an example decoding of bits B[1:0] to clock signal selection.

TABLE 4

| Symbol in "B" UI | TxP decoder selection | TxN decoder selection |
|---|---|---|
| B[1:0] = −2 = 00 | ↓@120° = $t_{b2}$ | ↑@0° = $t_{b0}$ |
| B[1:0] = −1 = 01 | ↓@60° = $t_{b1}$ | ↑@0° = $t_{b0}$ |
| B[1:0] = +1 = 10 | ↓@0° = $t_{b0}$ | ↑@60° = $t_{b1}$ |
| B[1:0] = +2 = 11 | ↓@0° = $t_{b0}$ | ↑@120° = $t_{b2}$ |

The clock phase selected by TxP "A" UI decoder 431 is output by TxP "A" UI clock phase MUX 441 as $TxP_A$ and is provided to the "A" input of TxP A-B MUX 451. The clock phase selected by TxP "B" UI decoder 432 is output by TxP "B" UI clock phase MUX 442 as $TxP_B$ and is provided to the "B" input of TxP A-B MUX 451. TxP A-B MUX 451 is controlled by UI decoder 420 to select $TxP_A$ during "A" unit intervals and to select $TxP_B$ during "B" unit intervals. The output of TxP A-B MUX 451 is an alternate TxP signal for a 4-value signaling pair.

Similarly, the clock phase selected by TxN "A" UI decoder 433 is output by TxN "A" UI clock phase MUX 443 as $TxN_A$ and is provided to the "A" input of TxN A-B MUX 452. The clock phase selected by TxN "B" UI decoder 434 is output by TxN "B" UI clock phase MUX 444 as $TxN_B$ and is provided to the "B" input of TxN A-B MUX 452. TxN A-B MUX 452 is controlled by UI decoder 420 to select $TxN_A$ during "A" unit intervals and to select $TxN_B$ during "B" unit intervals. The output of TxN A-B MUX 452 is an alternate TxN signal for a 4-value signaling pair.

Note from tables 1-4, that the directions of the transitions of TxP from transmitter 400 are the same as transmitter 300, but the directions of the transitions of TxN from transmitter 400 are the opposite as transmitter 300. Thus, in "A" unit intervals TxP from transmitter 400 rises but TxN falls. Similarly, in "B" unit intervals TxP from transmitter 400 falls but TxN rises.

Figure 5:
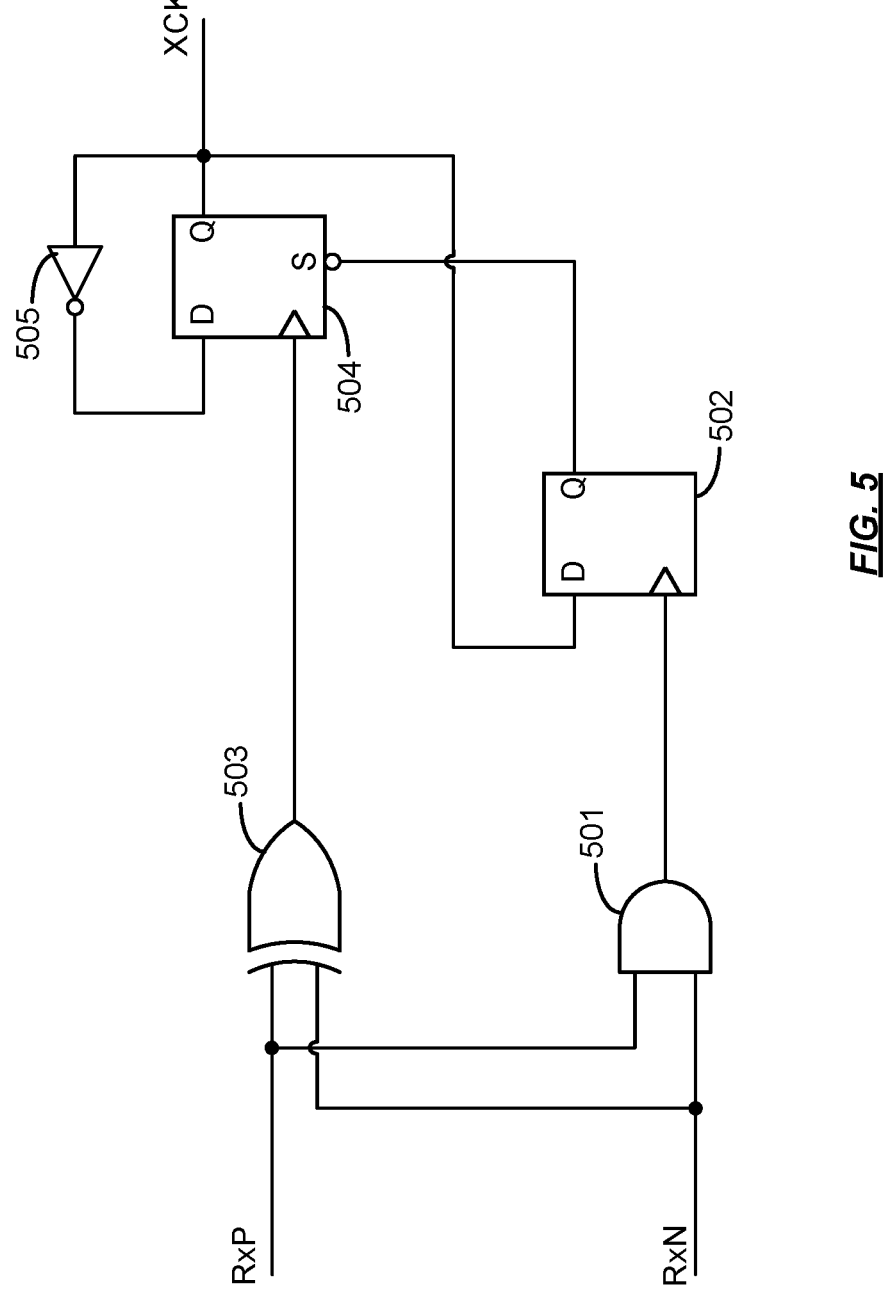
FIG. 5 is a schematic diagram illustrating an example clock extraction circuit.

FIG. 5 is a schematic diagram illustrating an example clock extraction circuit. In FIG. 5, clock extractor 500 comprises AND-gate 501, D-latch 502, XOR-gate 503, D-latch 504, and inverter 505. Input signals RxP (e.g., corresponding to TxP of transmitter 300) and RxN (e.g., corresponding to TxN of transmitter 300) are inputs to clock extractor 500. RxP is provided to a first input of AND-gate 501 and a first input of XOR-gate 503. RxN is provided to a second input of AND-gate 501 and a second input of XOR-gate 503.

The output of XOR-gate 503 is coupled to the clock input of D-latch 504. Thus, when RxP and RxN transition to a state where both are different logical values (e.g., at $t_{a0}$ in FIG. 1A or $t_{b0}$ in FIG. 1B), D-latch 504 latches the value at its D input and provides that value to its Q output. The value at the output of D-latch 504 (XCK—extracted clock signal) is inverted by inverter 505 and provided to the D input of D-latch 504. Thus, each time RxP and RxN transition to a state where both are different logical values, it causes XCK to change values.

The output of AND-gate 501 is coupled to the clock input of D-latch 502. Thus, when RxP and RxN transition to a state where both are a logical "1" (e.g., at $t_{a1}$ or $t_{a2}$ in FIG. 1A), D-latch 502 latches the value of XCK at its D input and provides that value to its Q output. The Q output of D-latch 502 sets the output of D-latch 504 to a logical "1". Thus, when RxP and RxN are in a state where both are a logical "1" and then transition to being different, it initializes the toggling of XCK such that XCK is a logical "0" during "A" unit intervals and a logical "1" during "B" unit intervals.

Figure 6:
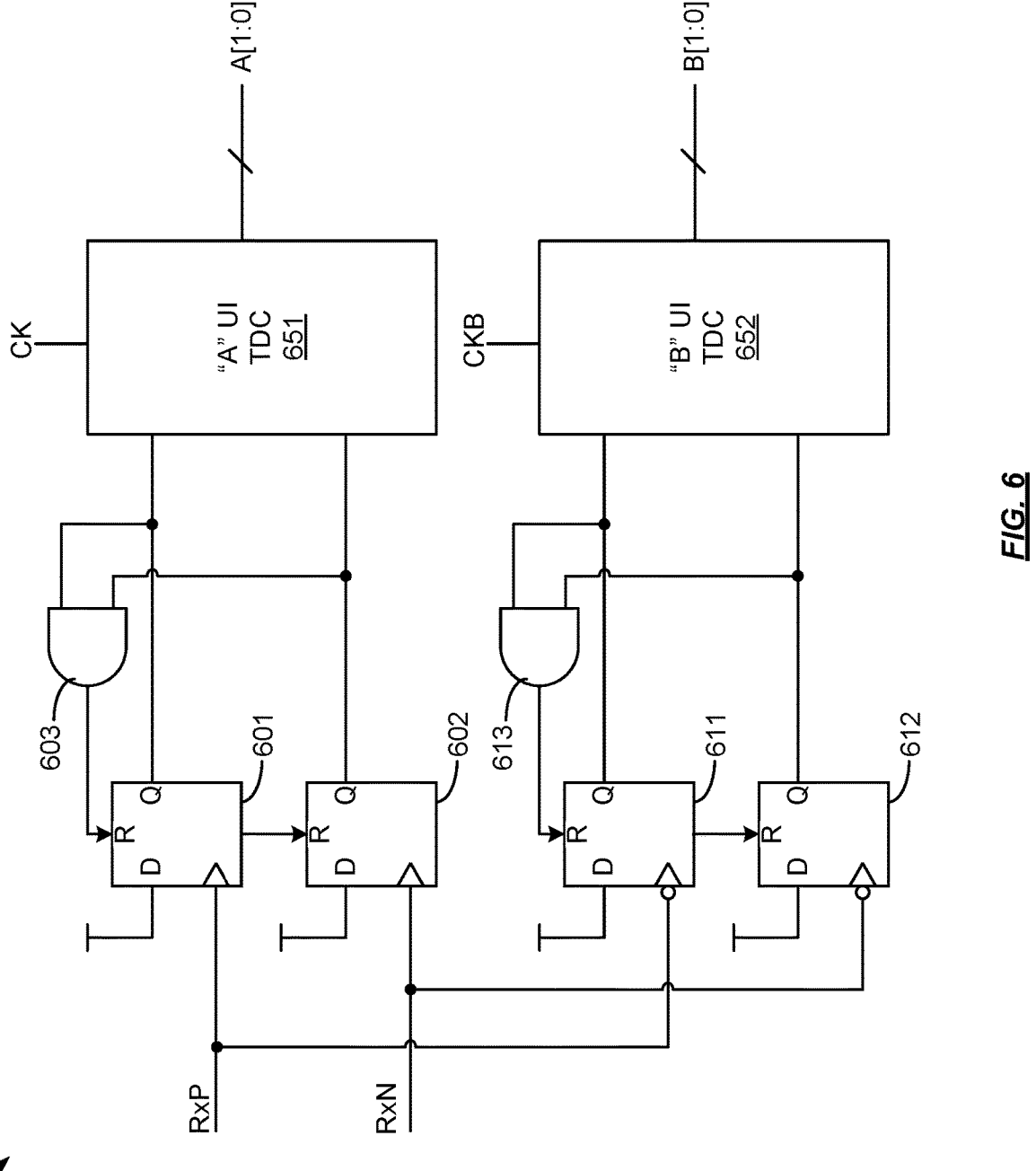
FIG. 6 is a block diagram illustrating an example 4-value per unit interval receiver.

FIG. 6 is a block diagram illustrating an example 4-value per unit interval receiver. In FIG. 6, receiver 600 comprises D-latch 601, D-latch 602, AND-gate 603, D-latch 611, D-latch 612, AND-gate 613, "A" unit interval time-to-digital converter (TDC) 651 and "B" UI TDC 652. D-latch 601, D-latch 602, AND-gate 603, and "A" UI TDC function to receive symbols A[1:0] transmitted during "A" unit intervals. D-latch 611, D-latch 612, AND-gate 613, and "A" UI TDC function to receive symbols B[1:0] transmitted during "B" unit intervals.

Input signals RxP (e.g., corresponding to TxP of transmitter 300) and RxN (e.g., corresponding to TxN of transmitter 300) are inputs to receiver 600. RxP is provided to the rising edge triggered clock input of D-latch 601 and the falling edge triggered clock input of D-latch 611. RxN is provided to the rising edge triggered clock input of D-latch 602 and the falling edge triggered clock input of D-latch 612. The D-inputs of latches 601-602 and latches 611-612 are tied to a logical "1".

The outputs of latch 601 and latch 602 are input to 2-input AND-gate 603 and TDC 651. The output of TDC 651 are the symbols A[1:0] transmitted during "A" unit intervals. The output of AND-gate 603 is coupled to reset the outputs of latch 601 and latch 602 to a logical "0". The outputs of latch 611 and latch 612 are input to 2-input AND-gate 613 and TDC 652. The output of TDC 652 are the symbols B[1:0] transmitted during "B" unit intervals. The output of AND-gate 613 is coupled to reset the outputs of latch 611 and latch 612 to a logical "0".

At the start of an "A" UI, RxN and RxP are both logical "0"'s. Likewise, the outputs of latch 601 and latch 602 are both logical "0"'s. When a first one of RxP or RxN transitions from low to high, (e.g., at time $t_{a0}$), the output of the corresponding latch 601-602, respectively, also transitions from low to high. When the other one of RxP or RxN transitions from low to high, (e.g., at time $t_{a1}$ or $t_{a2}$) the output of the other latch 601-602 transitions from low to high. TDC 651 converts the rising transitions on the outputs of latches 601-602 to the "A" unit interval symbols A[1:0] using the order (i.e., which of latch 601 and latch 602 rose first and which second) and delay between the rising transitions. A clock signal (e.g., XCK from clock extractor 500) is input to TDC 651 to synchronize TDC 651 with the "A" unit intervals.

At the start of a "B" UI, RxN and RxP are both logical "1"'s. The outputs of latch 601 and latch 602 are both logical "0"'s. When a first one of RxP or RxN transitions from high to low, (e.g., at time $t_{b0}$), the output of the corresponding latch 611-612, respectively, transitions from low to high. When the other one of RxP or RxN transitions from high to low, (e.g., at time $t_{b1}$ or $t_{b2}$) the output of the other latch 611-612 transitions from low to high. TDC 652 converts the rising transitions on the outputs of latches 611-612 to the "B" unit interval symbols B[1:0] using the order (i.e., which of latch 611 and latch 612 rose first and which second) and delay between the rising transitions. A clock signal (e.g., an inverted XCK from clock extractor 500) is input to TDC 652 to synchronize TDC 652 with the "B" unit intervals.

Figure 7:
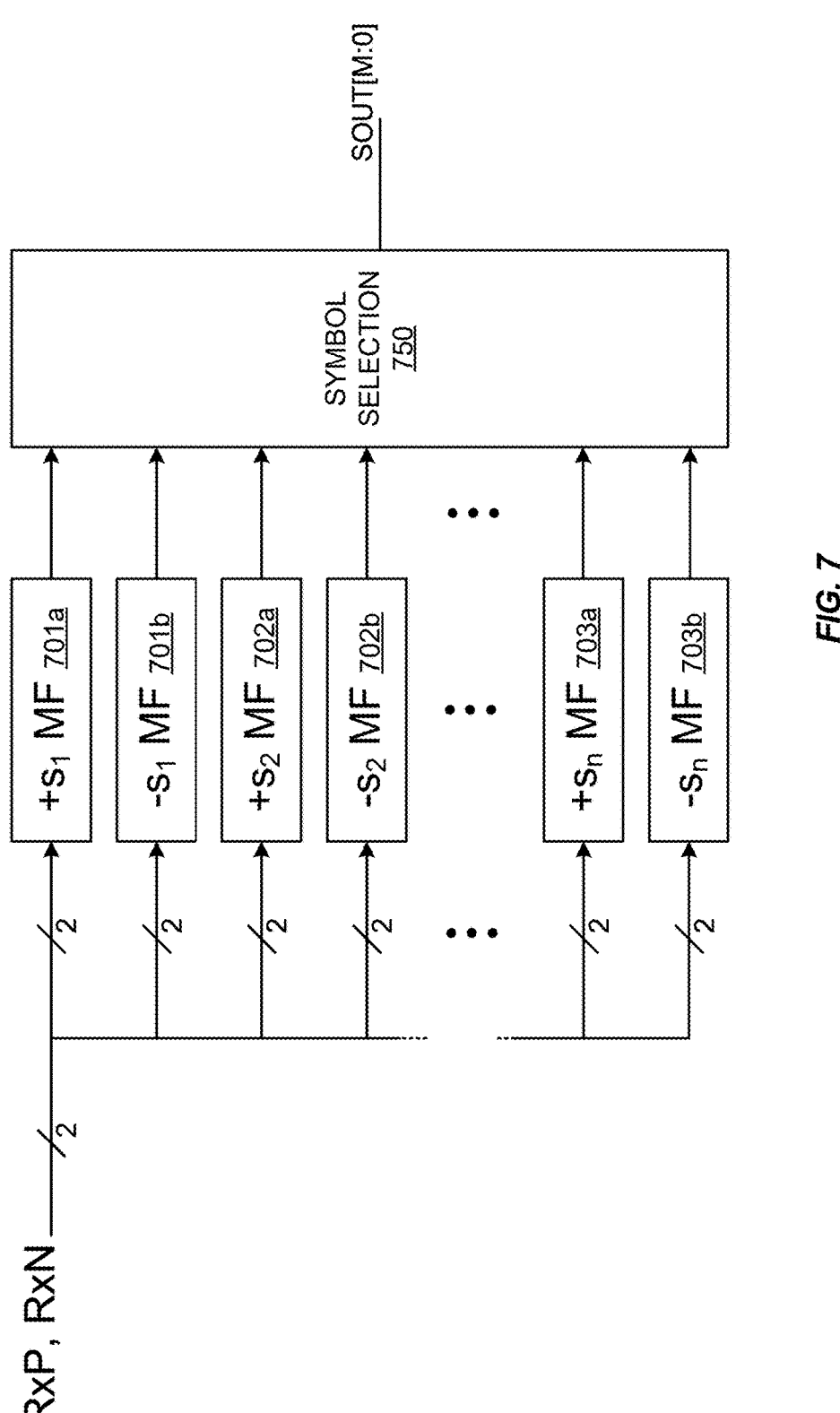
FIG. 7 is a block diagram illustrating a matched filter based 2N-value per unit interval receiver.

FIG. 7 is a block diagram illustrating a matched filter based 2N-value per unit interval receiver. In FIG. 7, receiver 700 comprises $+s_1$ matched filter 701a, $-s_1$ matched filter 701b, $+s_2$ matched filter 702a, $-s_2$ matched filter 702b, $+s_n$ matched filter 703a, and $-s_n$ matched filter 703b, and symbol selection circuitry 750. Input signals RxP (e.g., corresponding to TxP of transmitter 300) and RxN (e.g., corresponding to TxN of transmitter 300) are inputs to receiver 700. SOUT[M:0] are outputs from receiver 700 where M is a positive integer large enough to allow SOUT[M:0] to represent 2×N symbols.

RxP and RxN are provided to each of the matched filters 701a-703a and 701b-703b. The outputs of matched filters 701a-703a and 701b-703b are provided to symbol selection circuitry 750. Symbol selection circuitry 750 selects as the symbol output SOUT[M:0] the symbol corresponding to the matched filter 701a-703a and 701b-703b that output an indicator indicating the strongest correlation between its associated symbol and the inputs RxP and RxN among all of the matched filters 701a-703a and 701b-703b for that unit interval.

Figure 8:
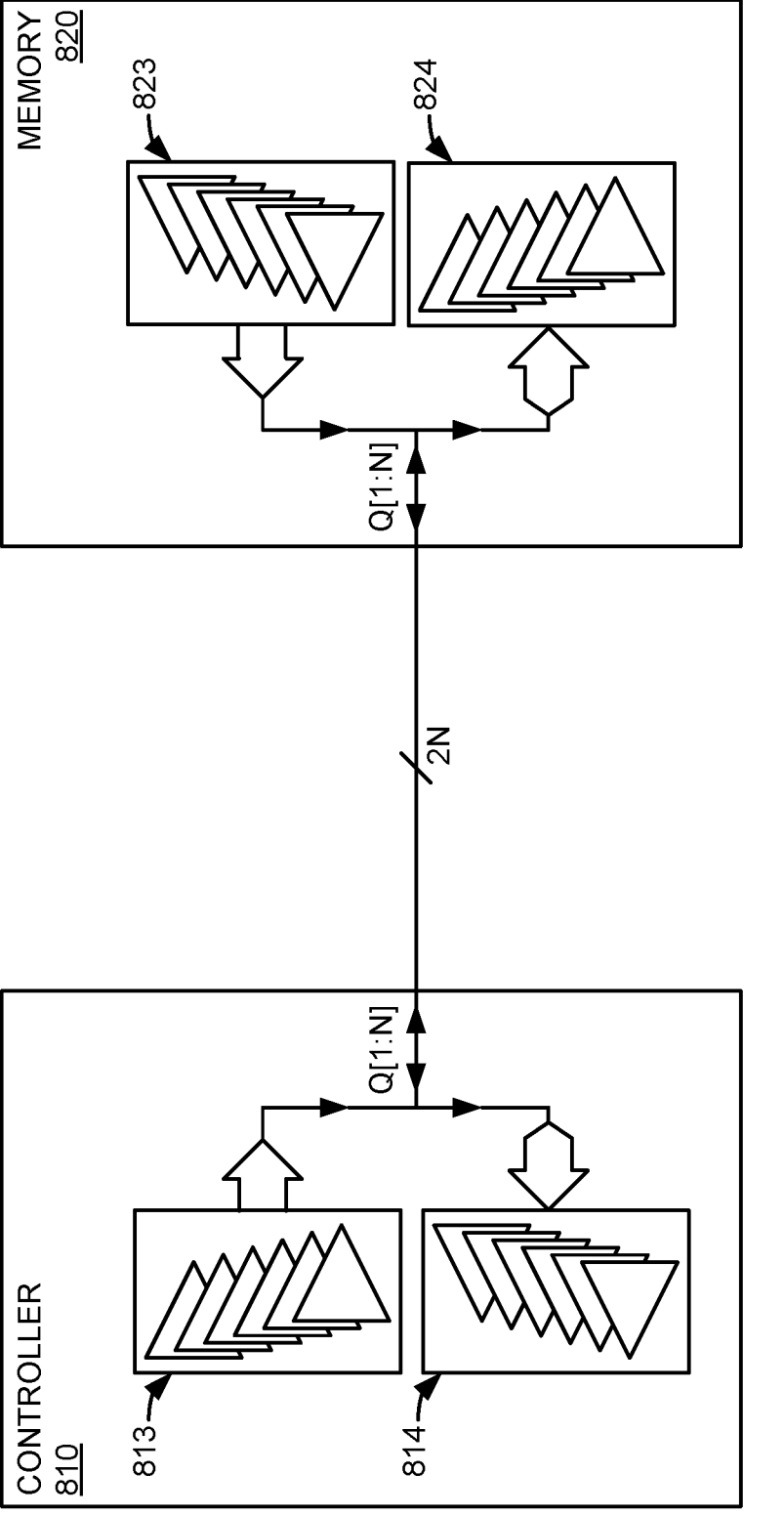
FIG. 8 is a block diagram illustrating a memory system.

FIG. 8 is a block diagram illustrating a memory system. In FIG. 8, memory system 800 comprises memory controller 810 and memory 820. Memory controller 810 includes drivers 813 and receivers 814. Memory controller 810 also includes N number of signal pairs Q[1:N] that may be driven by two or more of drivers 813 and may receive signals to be sampled by one or more of receivers 814. Memory 820 includes drivers 823 and receivers 824. Memory 820 also includes N number of signal pairs Q[1:N] that may be driven by two or more of drivers 823 and may receive signals to be sampled by one or more of receivers 824. Signal pair ports Q[1:N] of memory controller 810 are operatively coupled to signal pair ports Q[1:N] of memory 820, respectively. Receivers 824 of memory 820 may receive one or more of the Q[1:N] signal pairs from memory controller 810. Receivers 814 of memory controller 810 may receive one or more of the Q[1:N] signal pairs from memory 820.

One or more of drivers 813 when configured and coupled with a corresponding one or more receivers 824 may form a 4-value or 2N-value signaling system as described herein. Thus, one or more of drivers 813 of memory controller 810 may correspond to transmitter 300 or transmitter 400 and one or more of receivers 824 may correspond to receiver 600 or receiver 700. Likewise, one or more of drivers 823 when coupled with a corresponding one or more receivers 814 may form may form a 4-value or 2N-value signaling system as described herein. Thus, one or more of drivers 823 of memory 820 may correspond to transmitter 300 or transmitter 400, and one or more of receivers 814 may correspond to receiver 600 or receiver 700.

Memory controller 810 and memory 820 are integrated circuit type devices, such as one commonly referred to as a "chip". A memory controller, such as memory controller 810, manages the flow of data going to and from memory devices, such as memory 820. For example, a memory controller may be a northbridge chip, an application specific integrated circuit (ASIC) device, a graphics processor unit (GPU), a system-on-chip (SoC) or an integrated circuit device that includes many circuit blocks such as ones selected from graphics cores, processor cores, and MPEG encoder/decoders, etc. Memory 820 can include a dynamic random access memory (DRAM) core or other type of memory cores, for example, static random access memory (SRAM) cores, or non-volatile memory cores such as flash. In addition, although the embodiments presented herein describe memory controller and components, the instant apparatus and methods may also apply to chip interfaces that effectuate signaling between separate integrated circuit devices.

It should be understood that signal pair ports Q[1:N] of both memory controller 810 and memory 820 may correspond to any pairs of input or output pins (or balls) of memory controller 810 or memory 820 that transmit information between memory controller 810 and memory 820 using either a 4-value or 2N-value signaling system as described herein. For example, signal pair ports Q[1:N] can correspond to bidirectional data pins (or pad means) used to communicate read and write data between memory controller 810 and memory 820. The data pins may also be referred to as "DQ" pins. Thus, for a memory 820 that reads and writes data up to 16 bits at a time, signal pair ports Q[1:N] can be seen as corresponding to pins DQ[0:15]. In another example, signal pair ports Q[1:N] can correspond to one or more unidirectional command/address (C/A) bus. Signal pair ports Q[1:N] can correspond to one or more unidirectional control pins. Thus, signal pair ports Q[1:N] on memory controller 810 and memory 820 may carry information such as CS (chip select), a command interface that includes timing control strobes such as RAS and CAS, address pins A[0:P] (i.e., address pins carrying address bits), DQ[0:X] (i.e., data pins carrying data bits), etc., and other pins in past, present, or future devices.

Figure 9:
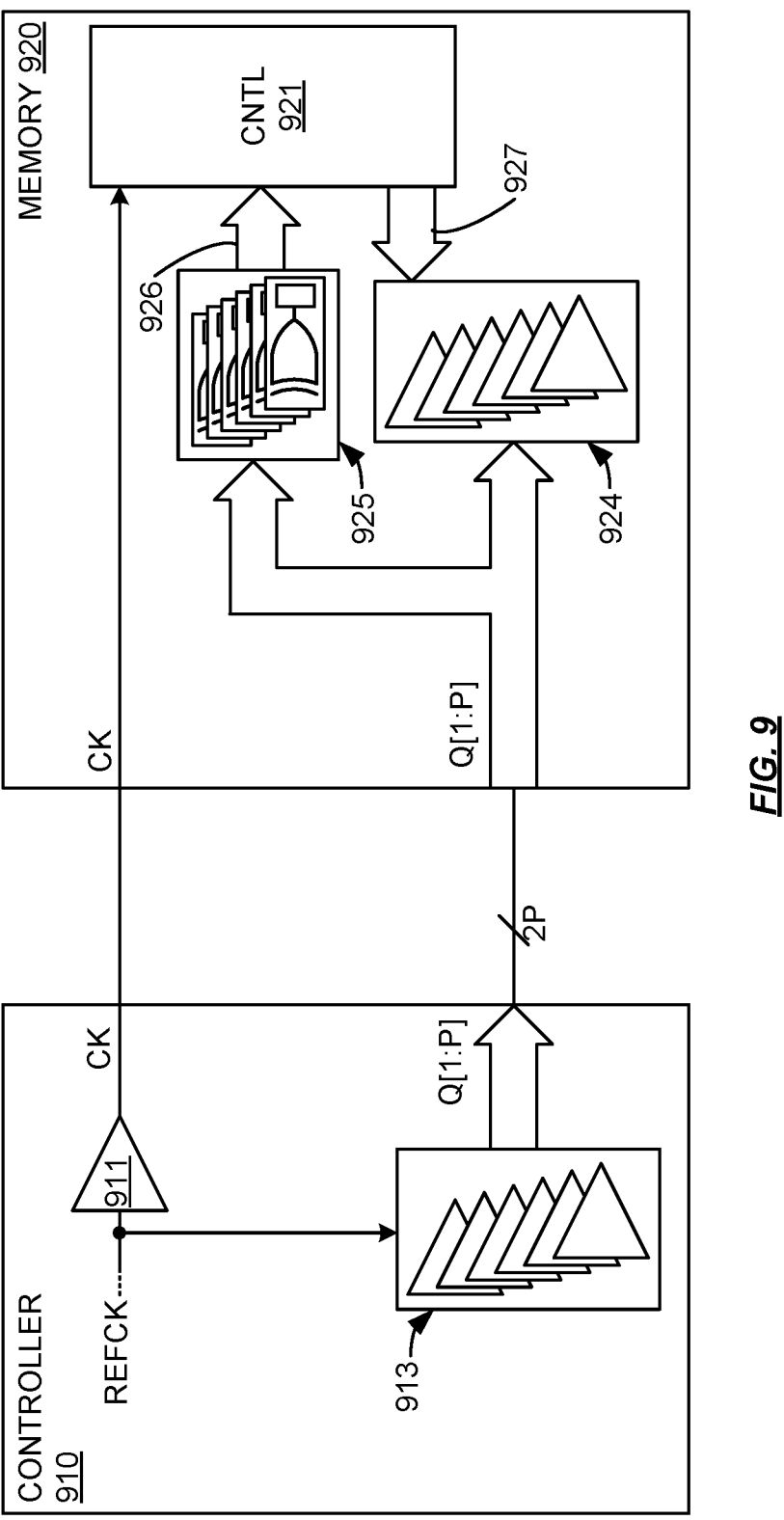
FIG. 9 is a block diagram illustrating a memory system with timing calibration.

FIG. 9 is a block diagram illustrating a memory system with timing calibration. In FIG. 9, memory system 900 comprises controller 910 and memory 920. Controller 910 comprises clock driver 911 and signal pair drivers 913 (e.g., transmitter 300 or transmitter 400). Memory 920 comprises control circuitry 921, signal pair receivers 924 (e.g., 4-value receiver 600 or 2N-value receiver 700), and clock extractors 925 (e.g., clock extractor 500).

Receivers 924 and clock extractors 925 receive signal pairs Q[1:P] transmitted by drivers 913. Control circuitry 921 receives a clock signal (CK) transmitted by clock driver

911 based on a reference clock (REFCK). REFCK is also provided to signal pair drivers 913.

Clock extractors 925 each extract clock signals 926 from respective signal pairs Q[1:P]. These extracted clock signals 926 are provided to control circuitry 921. Control circuitry 921 may use extracted clock signal 926 to generate control signals 927 that calibrate or otherwise adjust parameters of receivers 924. Control circuitry 921 may use extracted clock signal 926 and the outputs of receivers 924 to provide training feedback or other calibration information to controller 910.

FIG. 10 is a flowchart illustrating a method of operating an integrated circuit. One or more steps illustrated in FIG. 10 may be performed by, for example, transmitter 300, transmitter 400, clock extractor 500, receiver 600, receiver 700, memory system 800, memory system 900, and/or their components. Via a first output, signals to indicate a first time sequence of binary valued bits comprising a first binary value and a second binary value are transmitted (1002). For example, controller 810, using transmitter 300, may output a first signal (e.g., TxP).

Via a second output, signals to indicate a second time sequence of binary valued bits comprising the first binary value and the second binary value are transmitted (1004). For example, controller 810, using transmitter 300, may output a second signal (e.g., TxN) of a two signal differential edge modulation scheme having one of four or more values and a clock pulse encoded in each unit interval, as described herein. The first output and the second output are controlled to collectively transmit a plurality of bits per unit interval encoded as relationships between transition timing of the first output and the second output and to collectively transmit a clock signal (1006). For example, controller 810, using transmitter 300, may output a pair of signal (e.g., TxP and TxN) encoded with a two signal differential edge modulation scheme having one of four or more values and a clock pulse encoded in each unit interval, as described herein.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of transmitter 300, transmitter 400, clock extractor 500, receiver 600, receiver 700, memory system 800, memory system 900, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 11:
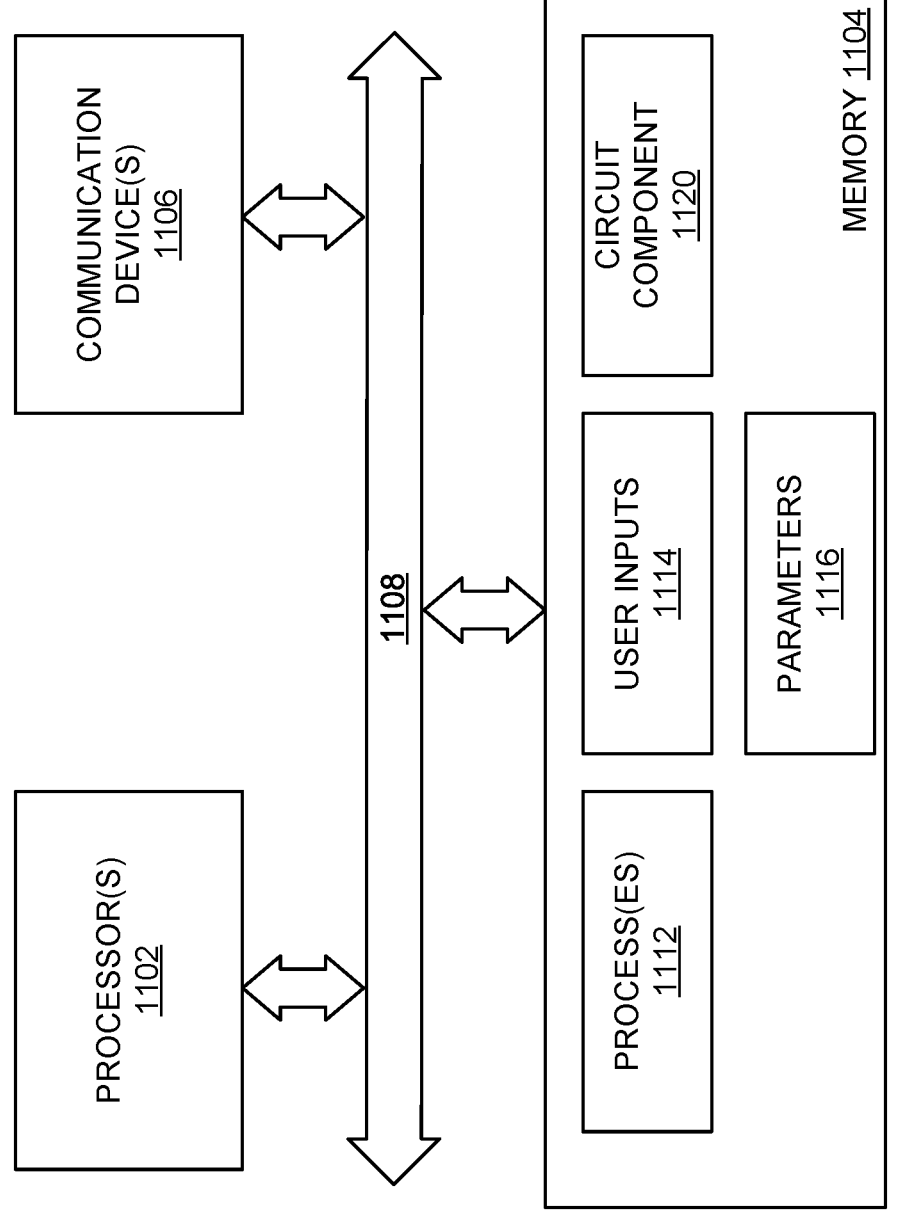
FIG. 11 is a block diagram of a processing system.

FIG. 11 is a block diagram illustrating one embodiment of a processing system 1100 for including, processing, or generating, a representation of a circuit component 1120. Processing system 1100 includes one or more processors 1102, a memory 1104, and one or more communications devices 1106. Processors 1102, memory 1104, and communications devices 1106 communicate using any suitable type, number, and/or configuration of wired and/or wireless connections 1108.

Processors 1102 execute instructions of one or more processes 1112 stored in a memory 1104 to process and/or generate circuit component 1120 responsive to user inputs 1114 and parameters 1116. Processes 1112 may be any suitable electronic design automation (EDA) tool or portion thereof used to design, simulate, analyze, and/or verify electronic circuitry and/or generate photomasks for electronic circuitry. Representation 1120 includes data that describes all or portions of transmitter 300, transmitter 400, clock extractor 500, receiver 600, receiver 700, memory system 800, memory system 900, and their components, as shown in the Figures.

Representation 1120 may include one or more of behavioral, register transfer, logic component, transistor, and layout geometry-level descriptions. Moreover, representation 1120 may be stored on storage media or communicated by carrier waves.

Data formats in which representation 1120 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1114 may comprise input parameters from a keyboard, mouse, voice recognition interface, microphone and speakers, graphical display, touch screen, or other type of user interface device. This user interface may be distributed among multiple interface devices. Parameters 1116 may include specifications and/or characteristics that are input to help define representation 1120. For example, parameters 1116 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1104 includes any suitable type, number, and/or configuration of non-transitory computer-readable storage media that stores processes 1112, user inputs 1114, parameters 1116, and circuit component 1120.

Communications devices 1106 include any suitable type, number, and/or configuration of wired and/or wireless devices that transmit information from processing system 1100 to another processing or storage system (not shown) and/or receive information from another processing or storage system (not shown). For example, communications devices 1106 may transmit circuit component 1120 to another system. Communications devices 1106 may receive processes 1112, user inputs 1114, parameters 1116, and/or circuit component 1120 and cause processes 1112, user inputs 1114, parameters 1116, and/or circuit component 1120 to be stored in memory 1104.

Implementations discussed herein include, but are not limited to, the following examples:

Example 1: An integrated circuit, comprising: a first transmitter having a first output to transmit signals to indicate a first time sequence of binary valued bits comprising a first binary value and a second binary value; a second transmitter having a second output to transmit signals to indicate a second time sequence of binary valued bits comprising the first binary value and the second binary value; and transmitter control circuitry to control the first transmitter and the second transmitter to collectively transmit a plurality of bits per unit interval encoded as transition timings between the first output and the second output and to collectively transmit a clock signal.

Example 2: The integrated circuit of example 1, wherein the clock signal is transmitted each unit interval.

Example 3: The integrated circuit of example 1, wherein the clock signal is transmitted as a transition between the first transmitter and the second transmitter concurrently indicating the first binary value and a first one of the first transmitter and the second transmitter indicating the second binary value concurrently with a second one of the first transmitter and the second transmitter indicating the first binary value.

Example 4: The integrated circuit of example 1, wherein the clock signal is transmitted as a transition between a first one of the first transmitter and the second transmitter indicating the first binary value concurrently with a second one of the first transmitter and the second transmitter indicating the second binary value and the first transmitter and the second transmitter concurrently indicating the first binary value.

Example 5: The integrated circuit of example 1, wherein, at an onset of each unit interval, the first transmitter and the second transmitter are to collectively transition from indicating a same binary value to indicating different binary values.

Example 6: The integrated circuit of example 1, wherein at an onset of each unit interval, the first transmitter and the second transmitter are to collectively transition from indicating different binary values to indicating a same binary value.

Example 7: The integrated circuit of example 6, wherein the plurality of bits per unit interval transmitted is equal to two (2).

Example 8: An integrated circuit, comprising: a first receiver having a first input to receive signals that indicate a first time sequence of binary valued bits comprising a first binary value and a second binary value; a second receiver having a second input to receive signals that indicate a second time sequence of binary valued bits comprising the first binary value and the second binary value; and decoder circuitry to receive the first time sequence and the second time sequence and, based on transition timings between the first input and the second input, output a plurality of bits per unit interval and a clock signal.

Example 9: The integrated circuit of example 8, wherein the clock signal is received each unit interval.

Example 10: The integrated circuit of example 8, wherein the clock signal is received as a transition between the first input and the second input concurrently indicating the first binary value and a first one of the first input and the second input indicating the second binary value concurrently with a second one of the first input and the second input indicating the first binary value.

Example 11: The integrated circuit of example 8, wherein the clock signal is received as a transition between a first one of the first input and the second input indicating the first binary value concurrently with a second one of the first input and the second input indicating the second binary value and the first input and the second input concurrently indicating the first binary value.

Example 12: The integrated circuit of example 8, wherein, at an onset of each unit interval, the first input and the second input are to collectively transition from indicating a same binary value to indicating different binary values.

Example 13: The integrated circuit of example 8, wherein at an onset of each unit interval, the first input and the second input are to collectively transition from indicating different binary values to indicating a same binary value.

Example 14: The integrated circuit of example 8, wherein the clock signal is indicated by an exclusive-OR of binary values indicated by the first input and binary values indicated by the second input.

Example 15: A method of operating an integrated circuit, comprising: transmitting, via a first output, signals to indicate a first time sequence of binary valued bits comprising a first binary value and a second binary value; transmitting, via a second output, signals to indicate a second time sequence of binary valued bits comprising the first binary value and the second binary value; and controlling the first output and the second output to collectively transmit a plurality of bits per unit interval encoded as relationships between transition timings of the first output and the second output and to collectively transmit a clock signal.

Example 16: The method example 15, wherein the clock signal is transmitted each unit interval.

Example 17: The method of example 15, wherein the clock signal is transmitted as a transition between the first output and the second output concurrently indicating the first binary value and a first one of the first output and the second output indicating the second binary value concurrently with a second one of the first output and the second output indicating the first binary value.

Example 18: The method of example 15, wherein the clock signal is transmitted as a transition between a first one of the first output and the second output indicating the first binary value concurrently with a second one of the first output and the second output indicating the second binary value and the first output and the second output concurrently indicating the first binary value.

Example 19: The method of example 15, wherein, at an onset of each unit interval, the first output and the second output collectively transition from indicating a same binary value to indicating different binary values.

Example 20: The method of example 15, wherein at an onset of each unit interval, the first output and the second output collectively transition from indicating different binary values to indicating a same binary value.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
a first transmitter having a first output to transmit signals to indicate a first time sequence of binary valued bits comprising a first binary value and a second binary value;
a second transmitter having a second output to transmit signals to indicate a second time sequence of binary valued bits comprising the first binary value and the second binary value; and
transmitter control circuitry to control the first transmitter and the second transmitter to collectively transmit a plurality of bits per unit interval encoded as transition timings between the first output and the second output and to collectively transmit a clock signal.

2. The integrated circuit of claim 1, wherein the clock signal is transmitted each unit interval.

3. The integrated circuit of claim 1, wherein the clock signal is transmitted as a transition between the first transmitter and the second transmitter concurrently transmitting signals that indicate the first binary value and a first one of the first transmitter and the second transmitter transmitting a first signal indicating the second binary value concurrently with a second one of the first transmitter and the second transmitter transmitting a second signal indicating the first binary value.

4. The integrated circuit of claim 1, wherein the clock signal is transmitted as a transition between a first one of the first transmitter and the second transmitter transmitting a first signal indicating the first binary value concurrently with a second one of the first transmitter and the second transmitter transmitting a second signal indicating the second binary value and the first transmitter and the second transmitter concurrently transmitting signals that indicate the first binary value.

5. The integrated circuit of claim 1, wherein, at an onset of each unit interval, the first transmitter and the second transmitter are to transmit signals that collectively transition from indicating a same binary value to indicating different binary values.

6. The integrated circuit of claim 1, wherein at an onset of each unit interval, the first transmitter and the second transmitter are to transmit signals that collectively transition from indicating different binary values to indicating a same binary value.

7. The integrated circuit of claim 6, wherein the plurality of bits per unit interval transmitted is equal to two (2).

8. An integrated circuit, comprising:
a first receiver having a first input to receive signals that indicate a first time sequence of binary valued bits comprising a first binary value and a second binary value;
a second receiver having a second input to receive signals that indicate a second time sequence of binary valued bits comprising the first binary value and the second binary value; and
decoder circuitry to receive the first time sequence and the second time sequence and, based on transition timings between the first input and the second input, output a plurality of bits per unit interval and a clock signal.

9. The integrated circuit of claim 8, wherein the clock signal is output each unit interval.

10. The integrated circuit of claim 8, wherein transitions between the first input and the second input concurrently receiving signals that indicate the first binary value and a first one of the first input and the second input receiving a first signal indicating the second binary value concurrently with a second one of the first input and the second input receiving a second signal indicating the first binary value are used to generate the clock signal.

11. The integrated circuit of claim 8, wherein transitions between a first one of the first input and the second input receiving a first signal indicating the first binary value concurrently with a second one of the first input and the second input receiving a second signal indicating the second binary value and the first input and the second input concurrently receiving signals that indicate the first binary value are used to generate the clock signal.

12. The integrated circuit of claim 8, wherein, at an onset of each unit interval, the first input and the second input are to receive signals that collectively transition from indicating a same binary value to indicating different binary values.

13. The integrated circuit of claim 8, wherein at an onset of each unit interval, the first input and the second input are to receive signals that collectively transition from indicating different binary values to indicating a same binary value.

14. The integrated circuit of claim 8, wherein the clock signal is indicated by an exclusive-OR of binary values received by the first input and binary values received by the second input.

15. A method of operating an integrated circuit, comprising:
transmitting, via a first output, signals to indicate a first time sequence of binary valued bits comprising a first binary value and a second binary value;
transmitting, via a second output, signals to indicate a second time sequence of binary valued bits comprising the first binary value and the second binary value; and
controlling the first output and the second output to collectively transmit a plurality of bits per unit interval encoded as relationships between transition timings of the first output and the second output and to collectively transmit a clock signal.

16. The method claim 15, wherein the clock signal is transmitted each unit interval.

17. The method of claim 15, wherein transitions between the first output and the second output concurrently transmitting signals indicating the first binary value and a first one of the first output and the second output transmitting a first signal indicating the second binary value concurrently with a second one of the first output and the second output transmitting a second signal indicating the first binary value are used to indicate transitions of the clock signal.

18. The method of claim 15, wherein transitions between a first one of the first output and the second output transmitting a first signal indicating the first binary value concurrently with a second one of the first output and the second output transmitting a second signal indicating the second binary value and the first output and the second output concurrently transmitting signals indicating the first binary value.

19. The method of claim 15, wherein, at an onset of each unit interval, the first output and the second output transmit signals that collectively transition from indicating a same binary value to indicating different binary values.

20. The method of claim 15, wherein at an onset of each unit interval, the first output and the second output transmit signals that collectively transition from indicating different binary values to indicating a same binary value.

* * * * *